United States Patent [19]

Seko et al.

[11] 4,112,045

[45] Sep. 5, 1978

[54] SEPARATION OF URANIUM ISOTOPES USING ANION EXCHANGERS

[75] Inventors: Maomi Seko; Tetsuya Miyaki, both of Tokyo, Japan

[73] Assignee: Asahi Kasei Kogyo Kabushiki Kaisha, Osaka, Japan

[21] Appl. No.: 701,912

[22] Filed: Jul. 1, 1976

Related U.S. Application Data

[63] Continuation of Ser. No. 403,294, Oct. 3, 1973, abandoned.

[30] Foreign Application Priority Data

Oct. 5, 1972 [JP] Japan .................................. 47-99407

[51] Int. Cl.$^2$ .............................................. B01D 59/30
[52] U.S. Cl. ............................................ 423/7; 423/6
[58] Field of Search ........................................ 423/6, 7

[56] References Cited

U.S. PATENT DOCUMENTS

| | | | |
|---|---|---|---|
| 2,770,520 | 11/1956 | Long et al. ............................... | 423/7 |
| 2,864,667 | 12/1958 | Bailes et al. ............................. | 423/7 |
| 3,511,620 | 5/1970 | Shimokawai et al. .................... | 423/7 |
| 3,869,536 | 3/1975 | James ...................................... | 423/7 |
| 3,953,568 | 4/1976 | Seko et al. ............................... | 423/7 |

OTHER PUBLICATIONS

Kakihana et al., *N.S.A.*, 17, Abs. #23839 (Jul. 1963).
Kakihana, *J. Ch. Phys. Tome*, 60, 81–88 (1963).
Gonda et al., *N.S.A.*, 21, Abs. #40982 (1967).

*Primary Examiner*—Edward A. Miller
*Attorney, Agent, or Firm*—Sughrue, Rothwell, Mion, Zinn and Macpeak

[57] ABSTRACT

Uranium-235 is efficiently concentrated using a solution containing uranium-238 and uranium-235 by passing a solution containing uranium (VI) complex anions through a body of an anion exchange material to adsorb uranium (VI) complex anions on a portion of the anion exchange material and then passing a solution of a reducing agent through the anion exchange material thus retaining uranium in the form of the uranium (VI) complex anions to elute the uranium ions while reducing the uranium (VI) complex anions to uranium (IV) complex ions.

30 Claims, No Drawings

SEPARATION OF URANIUM ISOTOPES USING ANION EXCHANGERS

This is a continuation of application Ser. No. 403,294, filed Oct. 3, 1973, now abandoned.

BACKGROUND OF THE INVENTION

1. Field of the Invention

The present invention relates to a process of chemically separating uranium isotopes. More particularly, the invention relates to a process of separating or concentrating uranium-235 from a solution containing uranium-238 and uranium-235 which comprises passing a solution of a reducing agent through an anion exchange material retaining uranium in the form of uranium (VI) complex anions. The solution of the reducing agent elutes the uranium ions and at the same time reduces the uranium (VI) complex anions to uranium (IV) complex ions.

2. Description of the Prior Art

Various attempts have hitherto been made for chemically separating uranium isotopes but it has been believed to be impossible to separate or concentrate uranium isotopes on an industrial scale or manner by utilizing ion exchange materials even though many ion-exchange separation processes for uranium isotopes have been reported. For example, Shimokawa et al. U.S. Pat. No. 3,511,620 discloses a process in which a solution of U(VI) ions enriched with $^{235}$U is obtained by eluting the U(IV) ions absorbed on a cation exchange resin with a solution of a salt of Fe (III). However, in such a process as mentioned above, $^{235}$U is only obtained as a solution of U(VI) ions by a single stage oxidation reaction, the multiplied concentration effects for $^{235}$U are not obtained, and hence a high degree of enrichment of $^{235}$U can not be obtained.

In Japanese Patent Application Laid Open No. 12700/72, a process for concentrating $^{235}$U is disclosed. The process comprises passing a solution of U(IV) ions through a cation exchange resin in equilibrium with a reducing agent to convert a part of the ion exchange resin to the U(IV) form and passing further a solution of an oxidizing agent through the cation exchange resin to move the uranium ions through the cation exchange resin as U(VI) ions, whereby the U(VI) ions are converted to U(IV) ions again by the action of the reducing agent of the cation exchange resin and adsorbed as the U(IV) ions on the cation exchange resin in a form of an adsorbed band or region, and then $^{235}$U is enriched in the U(IV) ion band near the boundary between the U(IV) ion band and the reducing agent or the oxidizing agent.

SUMMARY OF THE INVENTION

In the process of this invention, on the other hand, an anion exchange material is utilized for concentrating $^{235}$U and because oxidation and reduction of uranium ions can be conducted more completely and more quickly as compared to the process described in Japanese Patent Application Laid Open No. 12700/72, a higher enrichment effect of $^{235}$U, that is, a higher separation factor for $^{235}$U, can be obtained.

Thus, according to the present invention there is provided a process for concentrating uranium-235 ($^{235}$U) using a solution of uranium isotopes which comprises passing a solution of a reducing agent through an anion exchange material converted previously to the form of uranium (VI) complex anions to elute the uranium ions while reducing the uranium (VI) complex anions to uranium (IV) complex ions.

According to another embodiment of this invention there is also provided a process for concentrating uranium-235 from a solution of uranium isotopes which comprises passing a solution containing uranium (VI) complex anions through an anion exchange material to convert a part of the anion exchange material to the form of the uranium (VI) complex anions, then passing a solution of a reducing agent to elute the uranium ions while reducing the uranium ions to uranium (IV) complex ions, oxidizing the uranium (IV) complex ions thus formed with an oxidizing agent while the ions are flowing, and moving the uranium ion band or region through an anion exchange material while adsorbing the uranium ions on the anion exchange material as the uranium (VI) complex anions.

DETAILED DESCRIPTION OF THE INVENTION

As described above, in the process of this invention, an anion exchange material is utilized and thus the uranium is adsorbed in the form of the complex anion. Since uranium atoms in anionic form (hereinafter simply uranium anions) have generally a lower overall electrical charge than uranium atoms in cationic form (hereinafter simply uranium cations), the rate of chemical reaction such as oxidation, reduction, ion-exchange reaction, etc., can be increased in the case of employing uranium anions, thus a high degree of enrichment can be achieved by the use of the uranium anions for the concentration of uranium-235. Another advantage of the use of uranium anions is that metal ions having multiple oxidation states can be utilized as an oxidizing agent or a reducing agent in the form of negatively charged complexes thereof. Furthermore, in using an anion exchange material, a solution of a compound having anions of negatively charged atomic groups, such as an oxide (e.g., chromic acid, dichromic acid, permanganic acid, metavanadic acid, tetravanadic acid and molybdic acid), a oxo-acid (e.g., hypochlorous acid, chlorous acid, chloric acid, perchloric acid, bromic acid, iodic acid and nitric acid), a salt of the oxide or oxo-acid (e.g., the sodium, potassim or ammonium salts), a salt of a metal having multiple oxidative states, such as a cerium compound., e.g., ceric sulfate, or ceric chloride, an iron compound, e.g., ferric chloride, or ferric sulfate, and a ferricyano compound such as potassium ferricyanate and sodium ferricyanate, etc., can be used as an oxidizing agent and also anions or negatively charged atomic groups showing a reducing action, such as sulfur compounds such as thiosulfuric acid ($H_2S_2O_3$), dithionic acid ($H_2S_2O_6$), and sulfurous acid ($H_2SO_3$) or the sodium, potassium and ammonium salts thereof; nitrogen compounds such as nitrous acid, hydrazine, hydrazine sulfonic acid, hydroxylamine, hydroxonium chloride, or hydroxylamine sulfonic acid; phosphorus compounds such as phosphorus acid and the sodium, potassium or ammonium salts thereof; metal ions having multiple oxidation states such as titanium compounds (e.g., titanic chloride, titanic sulfate); vanadium compounds (e.g., vanadium dichloride, vanadous sulfate); chromium compounds (e.g., chromous chloride, chromous sulfate, chromous acetate); molybdenum compounds (e.g., molybdenum (III) chloride); stannous compounds (e.g., stannous chloride and stannous hydroxide); cuprous compounds (e.g., cuprous chloride, cuprous carbonate, cuprous cyanide and cuprous potassium cyanide ($K_3Cu(CN)_4$)); and organic compounds such as formic acid, oxalic acid, and the sodium, potassium and ammonium salts thereof; can be used as a reducing agent.

On the other hand, the process disclosed in Japanese Patent Application Laid Open No. 12700/72 has the disadvantages that other materials than metal cations having multiple oxidation states can not be used as an oxidizing agent or a reducing agent, and that a poor separation factor for $^{235}U$ and $^{238}U$ can only be obtained because of the low reaction rate.

According to the process of this invention, a solution of a reducing agent, generally at a concentration of 0.01 to 2N, preferably 0.05 to 0.5N, is passed through an anion exchange material such as an organic anion exchange resin or an inorganic anion exchange material (herein the term "material" will be used for brevity to describe both of these organic and inorganic types) substituted in the form of U(VI) complex anions to elute the uranium ions while reducing the U(VI) complex ions to U(IV) complex ions, whereby the $^{235}U$ is concentrated at the rear portion of the uranium ion band or region. The U(IV) ions or U(VI) ions readily form complex ions with anions present in an aqueous solution to give various complex ions, mostly anionic, having different coordination numbers depending upon the concentration of the uranium or the electrolyte present in the solution, the magnitude of the electrical charge of the anions therein, the hydrogen ion concentration of the solution, etc., and anionic complex ions are readily anion exchange materials.

When in the process of this invention the anionic complex-ions having U(VI) ions as the nuclei are preliminarily adsorbed on an anion exchange material and then an electrolyte solution containing a reducing agent is passed through the anion exchange material to elute the complex ions while reducing the U(VI) complex ions to U(IV) complex ions, $^{235}U$ is concentrated at the boundary of the complex ion band of uranium in contact with the reducing agent. In this case, the concentration of uranium and the concentration of the anions in the solution depend upon the type of anion exchange material used, the operation temperature, and the type of the anions but in general the concentration of uranium is so selected to be in the range of $10^{-4}M$ to 6M and the concentration of the anions, for example, chloride ions, is so selected to be in the range of $10^{-3}M$ to 12M that the degree of enrichment for $^{235}U$ becomes maximum.

The anions for forming the uranium complex in the above operation are those anions capable of forming complex ions having a high degree of coordination, i.e., a high coordination number, with the U(VI) ions or U(IV) ions. The uranium complex ions thus formed have a negative charge and are adsorbed sufficiently on the anion exchange material. Examples of preferred anions include inorganic ions such as $F^-$, $Cl^-$, $Br^-$, $NO_3^-$, $SCN^-$, $CN^-$, $SO^{2-}$, in the form of the acid or water soluble salts such as the sodium, potassium or ammonium salts, etc.; ions of monocarboxylic acids such as formic acid, acetic acid, monochloroacetic acid, dichloroacetic acid, etc.; ions of dicarboxylic acids such as oxalic acid, malonic acid, maleic acid, phthalic acid, etc.; ions of hydroxy acids such as glycolic acid, β-hydroxypropionic acid, lactic acid, hydroxysuccinic acid, tartaric acid, citric acid, sulfosalicylic acid, etc.; ions of amino acids such as glycine, alanine, βalanine, aspartic acid, glutamic acid, etc.; ions of aminopolycarboxylic acids such as nitrilotriacetic acid, ethylenediaminetetraacetic acid (EDTA), 1,2-cyclohexanediaminetetraacetic acid, etc.; and the water soluble salts (e.g., the sodium, potassium and ammonium salts) of these acid.

The reducing agents used in this invention are those capable of quickly reducing U(VI) ions to U(IV) ions in aqueous solution, the oxidation product of the reducing agent thus formed having a sufficiently low selectivity to the anion exchange material that the U(VI) ions adsorbed on the anion exchange material substantially are not eluted from the anion exchange material. Examples of preferred reducing agents include sulfur compounds, nitrogen compounds, phosphorus compounds and organic compounds such as the formates and oxalates, and compounds of a metal having multiple oxidation states in a reduced form, such as vanadium compounds, chromium compounds, molybdenum compounds, stannous compounds, cuprous compounds and titanous compounds. If the rate of reduction of the U(VI) complex ions by the reducing agent used is not sufficiently high, the reduction reaction can be promoted by conducting the reaction at an elevated temperature of between 30° C. and 100° C. or under irradiation with light, for example, visible or UV light of a wave length of about 500 nm to about 200 nm. However, the above procedure is generally unnecessary since the rate of reduction is usually sufficiently higher than that of the ion-exchange equilibrium.

The temperature of the solution supplied to the anion exchange material in this invention depends upon the types of oxidizing agent, reducing agent, and anion exchange material used and is selected between 0° C. and 100° C., but is preferably in the range of 15° C. to 80° C.

In the case of concentrating $^{235}U$ by the process of this invention, generally a solution of the reducing agent is passed through an anion exchange material which has been converted to a U(VI) complex ion-type and recovering the $^{235}U$-enriched portion from the boundary of the uranium complex ion adsorbed on the anion exchange material in contact with reducing agent therein. But, in the specific case of this invention, the uranium isotopes can be separated by such a manner that a solution containing uranium isotopes in the form of U(VI) complex ions or U(IV) complex ions is passed through an anion exchange material containing an oxidizing agent to convert the anion exchange material to the form of the U(VI) ions, then a solution of a reducing agent is passed through the U(VI) ion-type anion exchange material to elute the uranium ions while reducing the U(VI) complex ions to U(IV) complex ions, the eluate containing the U(IV) complex ions thus obtained is passed through an anion exchange material to oxidize the U(IV) complex ions to the U(VI) complex ions at the contacting front between uranium and oxidizing agent. Thus, a U(VI) complex ion band bonded by the front and rear boundaries is formed on the anion exchange material. The U(VI) complex ion band moves through the anion exchange material as the solution of reducing agent flows through the material, whereby $^{238}U$ is concentrated in the front portion of the uranium ion band which is in contact with the oxidizing agent (the portion of the first fraction withdrawn from the bottom of the anion exchange column), while the $^{235}U$ is concentrated in the rear portion of the uranium ion band which is in contact with the reducing agent (the portion of the last fraction withdrawn from the bottom of the column) and thus the fraction of eluate enriched with each uranium isotope can be obtained.

According to the aforesaid process, highly enriched $^{235}U$ can be obtained by moving the U(VI) complex ion band formed on the anion exchange material through a sufficiently long distance of the anion exchange material. That is, one or more columns are filled with the anion exchange material used in this process and by moving the uranium ion band through the column or columns filled with the anion exchange material, a sufficiently high degree of enrichment for the $^{235}U$ is obtained. For example, in order to concentrate the $^{235}U$ present in the natural isotopic ratio (molar ratio) to a content of 3% on a molar basis, it is generally necessary to move the uranium ion band through a distance of 10 to 1000 meters of anion exchanger column and thus by moving the uranium ion band through one or more columns of anion exchange material, a sufficiently high degree of enrichment for $^{235}U$ can be obtained. In using more than two anion exchange columns for obtaining a high degree of enrichment for $^{235}U$, the fractions containing the uranium isotopes withdrawn from the bottom of the first anion exchange column are supplied successively to the top of the second anion exchange column containing an oxidizing agent without mixing the fractions to form a uranium ion band and then a solution of a reducing agent is passed through the second column from the top thereof to move the uranium ion band. The first anion exchange column through which the uranium ion band has been completely eluted is washed once with an acidic solution, such as a solution of a strong acid such as hydrochloric acid, sulfuric acid, nitric acid, phosphoric acid, perchloric acid, or chloric acid at a concentration of about 0.1 to 2.0N, preferably 0.3 to 1.0N, and then treated with a solution of an oxidizing agent for the next treatment of the uranium ion band. By repeating this operation, the uranium ion band is moved through the anion exchange columns until the degree of enrichment for $^{235}U$ becomes sufficiently high and finally the fraction thus enriched with $^{235}U$ is withdrawn from the bottom of the column. In this case the eluate containing uranium isotopes is recovered in three fractions, namely a depleted portion or a first fraction having a high concentration of $^{238}U$, a middle fraction having approximately the natural isotopic ratio, and a last fraction highly enriched with $^{235}U$. Among the fractions thus recovered the middle fraction having approximately the natural isotopic ratio is combined with a fresh solution of uranium ions to be supplied for repeating the concentration operation and hence the entire solution of uranium supplied as the raw material to the concentration system is recovered as the $^{235}U$-enriched portion or the $^{235}U$-depleted portion (i.e., $^{238}U$-enriched portion). As described above, according to the process of this invention, the $^{235}U$ in the solution of uranium ions supplied to the anion exchange column or columns is concentrated to a sufficiently high degree of enrichment while the solution of uranium moves through the anion exchange material as the uranium ion band and thus it is unnecessary to make use of a so-called cascade, which makes the process quite simple.

In practicing the concentration of uranium isotopes by the aforesaid process of this invention, the uranium ion band forms a very clear booundary with the oxidizing agent or the reducing agent in contact with it on the anion exchange material, and the uranium ion band moves through the ion exchange column while maintaining the boundary. Even when the uranium ion band moves along a long anion exchange column, the diffusion of the boundary is generally very slight. In the case of using a high speed ion exchange material which is porous or has exchange groups only in the surface layer, the flowing speed of the solution of the reducing agent can be increased while restraining the diffusion of the boundary as is the case of using an ordinary granular ion-exchange resin, and hence the employment of such a high speed ion exchange material is more useful.

The oxidizing agent preferably used in the case of concentrating uranium isotopes in the process of this invention is a compound which is adsorbed on an anion exchange material, quickly oxidizes the U(IV) complex ions in a solution brought into contact with it to U(VI) complex ions, and at the same time is eluted from the anion exchange material in an exchange with the U(VI) complex ions thus formed. As described previously, examples of such an oxidizing agent include an oxide or an oxo-acid or the sodium, potassium or ammonium salts thereof, and a metal salt in a highly oxidized state, such as a ferric salt and a cerium salt.

For example, an aqueous ferric chloride solution acidified with hydrochloric acid is passed through a column filled with an anion-exchange material to adsorb ferric complex ions on the anion-exchange material and then an aqueous hydrochloric acid solution containing U(IV) complex ions is passed through the column, whereby the U(IV) complex ions are oxidized to U(VI) complex ions at the boundary of the U(IV) complex ions and the ferric ions, the U(VI) complex ions being adsorbed on the anion-exchange material and the ferrous ions formed being eluted from the system. In this case, because the selectivity of the ferrous complex ions to the anion-exchange material is lower than that of the ferric complex ions, only the ferrous ions are eluted but the ferric ions remain on the anion-exchange material.

Any anion exchange materials which can retain the U(VI) complex anions and can selectively release the U(IV) complex anions formed by a solution of a reducing agent supplied as an eluent can be used as the anion exchange material in this invention. Suitable anion exchange resins are disclosed in Friedrich Helfferich, *Ion Exchange*, Chap. 3, p26–71, McGraw Hill, 1962, and U.S. Pat. Nos. 2,883,349; 2,597,439; 2,591,574; 2,597,440 and 2,614,099 and British Pat. No. 785,157. A specific example of such an anion exchange material is an insoluble exchange resin prepared by copolymerizing an unsaturated monomer containing one olefinically unsaturated bond and unsaturated monomer containing more than one olefinically unsaturated bond to form a base resin and introducing, if necessary, an amino group, a quaternary ammonium group, etc., to the resin by a chemical reaction. Examples of the monomers used in the above copolymerization are styrene, chloromethylstyrene, vinylpyridine, dimethylaminoethyl acrylate, methylvinyl imidazole, divinylbenzene, ethyleneglycol dimethacrylate, etc. As the structure of the anion exchange resin, there are such primary, secondary and tertiary amines as benzylamino group, phenylamino group, pyridine, imidazole, alkylamino groups, etc., and the quaternary ammonium groups of these amines, and the sulfonium group.

Also, an insoluble exchange material comprising phenylenediamine, polyethylenediamine, or formaldehyde prepared by the polycondensation or addition polymerization of a basic organic compound having an amino group or a quaternary ammonium group and also an insoluble exchange material prepared by curing polyethyleneimine with epichlorohydrin can be used in this invention. Suitable such anion exchange resins are disclosed in U.S. Pat. No. 3,092,617 and Belgian Pat. No. 62,714.

Furthermore, cellulosic anion exchange resins can be used. These cellulosic anion exchange resins are commercially available as Cellex GE (a strong basic anion exchange resin having a guanidoethyl functional group), Cellex T (a strong basic anion exchange resin having a tolylethylaminoethyl functional group) and Cellex D (a strong basic anion exchange resin having a diethylaminoethyl functional group) produced by Bio-Rad Labs. Additionally inorganic anion exchange material such as hydrated zirconium oxide and zirconium phosphate resins described by C. B. Amphlett *Inorganic Ion Exchangers*, Chap. 5, p92–111, Elseviere Publishing Co., (1964) can be used in this invention.

In using these anion exchange materials for the concentration of uranium isotopes by the process of this invention, it is required that the adsorption of ions onto and desorption or release of ions from the anion exchange material occur quite quickly in order to selectively adsorb or release the U(IV) complex anions and the U(VI) complex anions formed by oxidation and reduction reactions, and further to prevent the isotopes thus concentrated from again being mixed. Therefore, many commercially available ion-exchange resins show large mixing effects of the isotopes and are not preferable for the practical purposes.

Various methods of making porous ion exchange materials for improving their adsorptive power have been proposed and thus by selecting an appropriate method, an ion exchange material suitable for the concentration of the desired isotope can be prepared. The degree of porosity is shown by the gram weight of the dry resin per 1 cc of, e.g., a chloride-type, wet anion exchanger (i.e., the capacity of the resin per unit volume divided by the capacity of the resin per unit weight as disclosed Dow Information Sheet Form No. 176-1080-69. It is desirable for obtaining a high degree of enrichment for uranium-235 by the process of this invention that the degree of porosity be less than 0.340 in the case of using a type-I anion exchange-resin quaternized by a tertiary alkylamine such as trimethylamine or triethylamine, less than 0.400 in the case of using a type-II anion-exchange resin quaternized by an alkanolamine such as methanol amine, ethanol amine, dimethanol amine, diethanol amine, trimethanol amine and triethanol amine, and less than 0.300 in the case of using an anion-exchange resin prepared by quaternizing a vinylpyridine-styrene-divinylbenzene copolymer with an alkyl halide such as methyl chloride, methyl bromide, methyl iodide, ethyl chloride, ethyl bromide or ethyl iodide. These porous anion exchange materials are described in Abrams, *Ind. Eng. Chem.*, 48, 1469 (1956) and in British Pat. Nos. 849,122, 932,125, 932,126 and 1,082,635 and in French Pat. No. 1,483,946. These type-I and type-II resins are commercially available and are described in Dow Information Sheets #6, #8 and #9 produced and published by the Dow Chemical Co.

Also, in order to prevent the concentrated isotopes from being mixed again, it is important to select properly the size of the ion exchange material particles. If the particle size is too large, the time required for release from the ion exchange material particles differs substantially between the ions present at the surface of the particle and the ions present in the center of the particle, which results in a re-mixing of the isotopes. On the other hand, if the particle size is too small, the release rate of ions is high, however, the flowing speed of the solution of reducing agent may be limited by the pressure loss in the column, which makes the use of such an ion exchange material impractical. The particle size of the ion exchange material used in this invention is generally from 5 to 500 mesh (from 4 mm to 0.03 mm in diameter), preferably from 50 to 200 mesh.

Furthermore, the re-mixing of the isotopes can be effectively prevented by using an ion-exchange material having ion-exchange groups as the surface layer only. For example, the aforesaid ion exchange material showing quite a high adsorption and desorption or release of uranium ions can be prepared by fixing on the surfaces of the particles an inactive material having no ion-exchange group, such as glass and Teflon, an ion exchange layer having a thickness of $d$ or by introducing an ion-exchange group in the inactive base resin material at a depth of $d$ from the surface. In this case, it is as a matter of course preferable to use the above-described porous ion-exchange resin as the material for the ion exchange layer to be fixed onto the surfaces of the inactive material or as the material for the base material of an ion exchange material in which the ion-exchange group is introduced. The thickness of the surface ion-exchange layer $d$ is generally from 0.005 mm to 0.150 mm. Suitable surface-type resins are described in U.S. Pat. No. 2,739,906.

The process of this invention will now be illustrated in greater detail by reference to the following practical examples but these examples are not to be interpreted as limiting the invention in any way. Unless otherwise indicated, all percents and parts are by weight.

EXAMPLE 1

A chloride-type anion-exchange resin prepared by chloromethylating a styrene-divinylbenzene copolymer and then quaternizing the copolymer with trimethylamine and having a porosity degree of 0.250 g.-dry resin/c.c.wet resin, a cross linking degree of 6%, and particle sizes of 100–200 mesh was filled uniformly up to a height of 80 cm. in a jacketed glass tube having an inside diameter of 1 cm. and length of 1 meter. Then, 0.4 M sulfuric acid was passed through the anion-exchange resin in an amount of about 20 times the equivalent of the exchange capacity of the resin to sufficiently equilibrate the anion-exchange resin with acid.

After dissolving 13.0 g of metallic uranium having the natural isotopic ratio into concentrated hydrochloric acid at room temperature (about 20°–30° C.), a slightly excessive equivalent (about 10% excess) amount of hydrogen peroxide solution to the metallic uranium was added to the solution to form a solution of uranyl chloride. Then, the solution of uranyl chloride thus formed was boiled gently for 30 minutes to evaporate the excess hydrogen peroxide. By adding further deionized water and sulfuric acid to the uranyl chloride solution, a solution containing 0.04 M uranyl chloride, 0.08 M hydrochloric acid, and 0.1 M sulfuric acid was prepared and the solution was passed through the aforesaid anion-exchange resin column until equilibrium was obtained, whereby the uranyl ions were adsorbed on the resin.

An aqueous solution of 0.06 M titanium trichloride and 0.1 M sulfuric acid prepared by dissolving spongy titanium metal in hydrochloric acid was supplied to the top of the column at a rate of 20 ml./hr. while maintaining the ion-exchange resin column at 40° C. to elute the uranium ions adsorbed on the anion-exchange resin by reducing the U(VI) complex ions to U(IV) complex ions. In this case, it was observed that the purple zone of titanium trichloride flowed down slowly through the anion-exchange resion column while forming a clear boundary and finally was eluted from the lower end of the column. The moving speed of the boundary was about 24 cm. per day.

The eluate withdrawn from the bottom of the column was recovered as separate fractions. When the amounts of U(VI) and U(IV) contained in each fraction were determined spectrophotometrically, they were substantially uniform in each fraction and were 0.0004 M and 0.029 M, respectively, on the average. Furthermore, the isotopic ratio of uranium in the three eluate samples of the last fraction thus withdrawn from the bottom of the column was determined using a mass-spectrometer; it was confirmed that the $^{235}U/^{238}U$ isotopic ratio (molar ratio) was 0.00747, 0.00737, and 0.00730, respectively, and, hence, it was 1.0303, 1.0166, and 1.0069 times, respectively, the natural isotopic ratio of 0.00725.

EXAMPLE 2

The anion-exchange resin as described in Example 1 was filled into two glass tubes as described in Example 1 and then a solution containing 0.05 M ferric sulfate and 0.6 M sulfuric acid was passed through each column until the anion-exchange resin in the column was sufficiently equilibrated to adsorb the ferric ions on the resin. Then, 20 ml. of an aqueous solution containing 0.04 M uranyl chloride and 0.2 M sulfuric acid was added dropwise to the top of the first column at a rate of 10 ml./hr. to form a U(VI) adsorption band of about 11.5 cm. in length at the upper portion of the column.

Then, a solution containing 0.05 M titanium trichloride and 0.2 M sulfuric acid was added dropwise to the top of the column at the rate of 15 ml./hr. while maintaining the column at 40° C. to move the U(VI) ion band adsorbed on the anion-exchange resin downward while maintaining a clear boundary at both ends of the band. The uranium ion band present between the red ferric ion zone and the purple trivalent titanium ion zone moved through the column at a rate of 20 cm./day and expanded until the width thereof reached 14.6 cm. The uranium ion band portion withdrawn from the bottom of the first column together with the eluent was supplied to the top of the second column through a tube having an inside diameter of 2 mm. to form similarly a uranium ion band in the second column. The uranium ion band was moved through the second column by passing a solution of titanium trichloride and sulfuric acid as an eluent. The uranium ion band portion was withdrawn from the bottom of the second column together with the eluent as separate fractions and the contents of U(VI) and U(IV) in each fraction were determined spectrophtometrically, they were substantially uniform in each fraction and were 0.0005 M and 0.023 M, respectively, on the average. Also, samples were taken from each of the first and the last fractions of the uranium ion band withdrawn from the bottom of the second column and the isotopic ratio of the uranium in each sample was measured using a mass-spectrometer; the $^{235}U/^{238}U$ isotopic ratio (molar ratio) was 0.00693 and 0.00759, respectively, and thus was 0.9559 times and 1.0469 times, respectively, the natural isotopic ratio of 0.00725.

EXAMPLE 3

A chloride-type anion-exchange resin prepared by converting substantially conpletely a vinylpyridine-divinylbenzene copolymer to a quaternary ammonium type using methyliodide and having a porosity degree of 0.260 g-dry resin/cc.-wet resin, a cross linking degree of 8%, and particle sizes of 100–200 mesh was filled uniformly up to a height of 80 cm. in a jacketed glass tube having an inside diameter of 1 cm. and a length of 1 meter and 6 M hydrochloric acid was passed through the column until the resin reached equilibrium. Then, a solution containing 0.01 M uranyl chloride and 6 M hydrochloric acid was passed through the column at a rate of 10 ml./hr. to adsorb the U(VI) complex ions on the anion-exchange resin.

Thereafter, a solution containing 0.06 M titanium trichloride and 6 M hydrochloric acid was supplied to the anion-exchange resin column at a rate of 10 ml./hr. to elute the U(VI) complex ions adsorbed on the anion-exchange resin while reducing the ions to U(IV) complex ions. In this case, it was observed that the purple zone of titanium trichloride moved slowly through the column while maintaining a clear boundary. The moving rate of boundary was about 20 cm./day.

The eluate withdrawn from the bottom of the column was recovered as separate fractions and the contents of the U(VI) complex ions and U(IV) complex ions in each fraction were determined spectrophotometrically, they were substantially uniform and were about 0.0003 M and 0.028 M, respectively, on the average.

Furthermore, three eluate samples were taken from the last fraction of the uranium ion band portion withdrawn from the bottom of the column and the uranium isotopic ratio in each fraction was measured using a mass-spectrometer; the $^{235}U/^{238}U$ isotopic ratio (molar ratio) was 0.00752, 0.00741 and 0.00735, respectively, and was 1.0372, 1.0262 and 1.0138 times the natural isotopic ratio of 0.00725.

While the invention has been described in detail and with reference to specific embodiments thereof, it will be apparent to one skilled in the art that various changes and modifications can be made therein without departing from the spirit and scope thereof.

What is claimed is:

1. A process for concentrating uranium-235 using a solution of uranium isotopes which comprises:
   passing a solution containing uranium isotopes in the form of uranium (VI) complex ions through a bed of an anion exchange material to absorb the uranium (VI) complex ions on the anion exchange material in the form of uranium (VI) complex anions, and then
   passing on aqueous solution of a reducing agent through said bed of an anion exchange material to elute said uranium (VI) complex anions adsorbed on said anion exchange material while simultaneously reducing said uranium (VI) complex anions to uranium (IV) complex ions thereby forming, in the downstream direction, a distinct boundary between a zone of reducing agent where the uranium (VI) complex anions have been eluted and a zone of adsorbed uranium (VI) complex anions, thereby concentrating uranium-235 isotope in the portion of adsorbed uranium (VI) complex anions adjacent to said boundary which moves through the anion exchange material while feeding the solution of the reducing agent to the anion-exchange material.

2. A process for concentrating uranium-235 using a solution of uranium isotopes which comprises:

passing a solution containing uranium isotopes in the form of either uranium (VI) complex ions, uranium (IV) complex ions or both, through a bed of an anion exchange material containing an oxidizing agent to convert a portion of said anion exchange material to the form of absorbed uranium (VI) complex anions, and then passing an aqueous solution of a reducing agent through said portion of adsorbed uranium (VI) complex anions to elute said uranium (VI) complex anions adsorbed on said anion exchange material while simultaneously reducing said uranium (VI) complex anions to uranium (IV) complex ions, thereby first forming an adsorbed band of uranium (VI) anions defined by front and rear boundaries with respect to the flow direction, the band moving through said anion exchange material while being in contact at the rear portion and rear boundary with said reducing agent and in the front portion and front boundary with said oxidizing agent, respectively, thereby concentrating uranium-235 at said rear portion of absorbed uranium (VI) complex anions on said anion exchange material.

3. The process as claimed in claim 2, wherein said anion exchange material is contained in more than one column, and wherein said eluted solution containing uranium (IV) complex ions is fed from one column to the next, thereby continuously forming uranium ion bands, and then passing an aqueous solution of a reducing agent through said columns.

4. The process as claimed in claim 2, wherein said anion exchange material is an anion exchange resin prepared by copolymerizing an unsaturated monomer containing one olefinically unsaturated bond and an unsaturated monomer containing more than one elefinically unsaturated bond and introducing amino groups or quaternary ammonium groups into the copolymer.

5. The process as claimed in claim 2, wherein said anion exchange material is a strongly basic anion exchange resin quaternized with a tertiary alkylamine and the degree of porosity thereof is less than 0.340.

6. The process as claimed in claim 2, wherein said anion exchange material is a strongly basic anion exchange resin quaternized with an alkanolamine and the degree of porosity thereof is less than 0.400.

7. The process as claimed in claim 2, wherein said anion exchange material is an anion exchange resin prepared by quaternizing a vinylpyridine-styrene-divinylbenzene copolymer with an alkyl halide and the degree of porosity thereof is less than 0.300.

8. The process as claimed in claim 2, wherein said anion exchange material is a granular anion exchange resin having a particle size of 5 to 500 mesh.

9. The process as claimed in claim 2, wherein said reducing agent is a titanium compound, vanadium compound, chromium compound, molybdenum compound, stannous compound or cuprous compound.

10. The process as claimed in claim 2, wherein said reducing agent contains a trivalent titanium compound.

11. The process as claimed in claim 2, wherein said oxidizing agent is a salt of a metal having multiple oxidative states selected from cerium compounds of ferric compounds.

12. The process is claimed in claim 2, wherein said oxidizing agent is ceric sulfate or ceric chloride.

13. The process as claimed in claim 2, wherein said oxidizing agent is ferric chloride or ferric sulfate.

14. The process as claimed in claim 2, wherein the anion of said uranium complex anion is a fluoride ion, chloride ion, or bromide ion.

15. The process as claimed in claim 2, wherein the anion of said uranium complex anion is the anion of a hydroxy acid or a water soluble salt thereof, said acid being selected from the group consisting of glycolic acid, $\beta$-hydroxy-propionic acid, lactic acid, hydroxysuccinic acid, tartaric acid, citric acid, and sulfosalicylic acid.

16. The process as claimed in claim 2, wherein the anion of said uranium complex anion is the anion of an amino acid or a water soluble salt thereof, said acid being selected from the group consisting of glycine, alanine, $\beta$-alanine, aspartic acid, and glutamic acid.

17. The process as claimed in claim 2, wherein the anion of said uranium complex anion is the anion of an aminopolycarboxylic acid selected from the group consisting of nitrilotriacetic acid, ethylenediamine tetraacetic acid, and 1,2-cyclohexanediaminetetraacetic acid.

18. The process as claimed in claim 2, wherein the process is conducted at a temperature of about 30° to 100° C.

19. The process as claimed in claim 2, wherein said solution of a reducing agent is an acidic solution acidified with sulfuric acid.

20. The process as claimed in claim 2 wherein the anion of said uranium complex anion is sulfate.

21. The process as claimed in claim 2 wherein said solution of reducing agent is acidified with hydrochloric acid.

22. The process of claim 2 wherein the reducing agent is capable of quickly reducing U(VI) ions to U(IV) ions and the oxidation product of said reducing agent having a sufficiently low selectivity to the anion exchange material that the U(VI) ions absorbed on the exahnge material are not substantially eluted from the anion exchange material.

23. The process of claim 22 wherein said oxidizing agent quickly oxidizes the U(VI) complex ions to U(VI) complex ions and at the same time is eluted from the anion exchange material in exchange with the U(VI) complex ions thus formed.

24. The process as claimed in claim 23 wherein said oxidizing agent is Fe(III) and said reducing agent is Ti(III), Mo(III), Cr(II) or V(III).

25. The process as claimed in claim 24 wherein said oxidizing agent is Fe(III) and said reducing agent is Ti(III).

26. The process of claim 25 wherein said oxidizing agent is ferric sulfate and said reducing agent is $TiCl_3$.

27. The process of claim 1 wherein the reducing agent is capable of quickly reducing U(VI) ions to U(IV) ions and the oxidation product of said reducing agent having a sufficiently low selectivity to the anion exchange material that the U(VI) ions absorbed on the exchange material are not substantially eluted from the anion exchange material.

28. The process of claim 27 wherein said reducing agent is Ti(III), Mo(III), Cr(II) or V(III).

29. The process of claim 28 wherein said reducing agent is Ti(III).

30. The process of claim 23 wherein said oxidizing agent is Fe(III) or Cr(III).

* * * * *